Jan. 4, 1955 W. A. EDSON 2,698,923
ELECTROMAGNETIC CAVITY RESONATOR
Filed Dec. 28, 1944 2 Sheets-Sheet 1

INVENTOR
W. A. EDSON
BY
*E. V. Griggs*
ATTORNEY

Jan. 4, 1955

W. A. EDSON 2,698,923

ELECTROMAGNETIC CAVITY RESONATOR

Filed Dec. 28, 1944

INVENTOR
W. A. EDSON
BY
ATTORNEY

United States Patent Office 2,698,923
Patented Jan. 4, 1955

2,698,923
ELECTROMAGNETIC CAVITY RESONATOR

William A. Edson, New York, N. Y., assignor to Bell Telephone Laboratories, Incorporated, New York, N. Y., a corporation of New York Application December 28, 1944, Serial No. 570,192

16 Claims. (Cl. 333—83)

This invention relates to frequency selective systems and more particularly to tunable electrical resonance chambers having means for suppressing oscillations of undesired modes.

A primary object of the invention is to provide a resonance chamber tunable over a range of frequencies and which shall present high Q for oscillations of a desired mode over the range of frequencies while strongly discriminating against oscillations of undesired modes.

Another object of the invention is to augment the discrimination which a resonance chamber presents between desired and undesired oscillations by operating the chamber with such a mode and frequency of oscillation that relatively few adjacent frequency modes exist.

Another object of the invention is to enable a resonance chamber to exhibit high Q for $TE_{0mn}$ mode oscillations of high order and to reduce the response of the chamber to oscillations of other modes in the same general frequency range.

Another object of the invention is to enable a resonance chamber to respond strongly to $TE_{0mn}$ oscillations where $m$ is a small integer, but to discriminate strongly against all TM mode oscillations and against $TE_{0mn}$ mode oscillations where $m$ is a larger integer such as 5.

Another object of the invention is to provide a resonance chamber with a reciprocating tuning device having a relatively low mass to reduce the effect of vibration.

A feature of the invention is the provision of slits or gaps in regions of an electric resonance chamber where the electric vector intensity of the undesired oscillation is high enough to promote escape of the undesired oscillations. A collateral feature is the provision of attenuation surfaces or masses to which such escaping undesired oscillations are subjected.

The nomenclature for modes has become substantially standard. TE denotes transverse electric modes, or modes whose electric lines lie in planes perpendicular to the cylinder axis; TM denotes transverse magnetic modes, or modes whose magnetic lines lie in transverse planes. The first numerical index refers to the number of nodal diameters, or to the order of the Bessel function associated with the mode. The second numerical index refers to the number of nodal circles or to the ordinal number of a root of the Bessel function associated with the mode. The third index represents the number of half wavelengths along the axis of the cylinder. Further data and graphs of TE and TM modes are disclosed in an article by J. P. Kinzer and I. G. Wilson, Bell System Technical Journal, January 1947, pages 31–79.

It is often desirable to provide electrically resonant chambers of high Q with means for varying the natural resonance frequency. For this purpose cylindrical chambers employing $TE_0$ mode oscillations have been found particularly useful. However, such $TE_0$ mode oscillations occur in pairs with $TM_1$ oscillations which in a perfect cylinder are of the same frequency. The $TM_1$ oscillations are of significantly lower Q and degrade the selectivity characteristic of the chamber. It is therefore one of the principal features of this invention to take advantage of the high Q of $TE_0$ mode oscillations and to so discriminate against the $TM_1$ and other unwanted modes that may fall within the frequency range of interest as to render them unimportant. This is accomplished by surface configurations of the resonance chamber which introduce high attenuation for the unwanted modes but which only slightly affect the desired $TE_0$ mode. The discriminating effect is augmented by providing leaks or escape outlets for the electric field of the unwanted modes in conjunction with attenuating surfaces or masses which dissipate their energy.

In accordance with the invention the tuning device is a piston fitting loosely within the cylinder to provide a circular peripheral gap in a region where the $TE_0$ component is of relatively low intensity but across which the $TM_1$ component is of relatively high intensity. A dissipating surface or mass is placed external to the gap to attenuate the energy of the $TM_1$ component to the field of which the surface or mass is subjected. The attenuating action may be augmented when a $TE_{0m}$ mode as e. g., $TE_{01}$ is desired by additional concentric slots in the tuner piston surface or in the opposite end surface or in both in conjunction with dielectric energy absorbing masses behind the slots the dielectric masses being in intimate contact with the metal piston surface plate, the slots being located in the region of nodal zones of the desired $TE_{0m}$ mode, but which are in regions of high intensity field for $TE_{0m'}$ modes in which $m'$ differs from $m$. As an additional element which may be used alone or in conjunction with either or both of the peripheral slot and concentric slot attenuators one of the plane end walls may be provided with a central embossed portion or a central depressed portion which because of its location where the $TE_0$ field is of low intensity has slight effect on that field but does introduce a considerable attenuation for the undesired oscillations of TM mode. In addition the cylindrical walls may be constituted of contiguous rings which, while exerting little effect on $TE_{0m}$ mode oscillations, serve to attenuate highly those oscillation modes having electric vectors parallel to the longitudinal axis of the cylinder. The contiguous rings may be formed as coatings or platings on the inner surface of a cylinder of dielectric material or as superposed rings of thin-walled tubing positioned within a cylinder of dielectric material which serves both as a structural support and as an attenuator.

Figure 1:
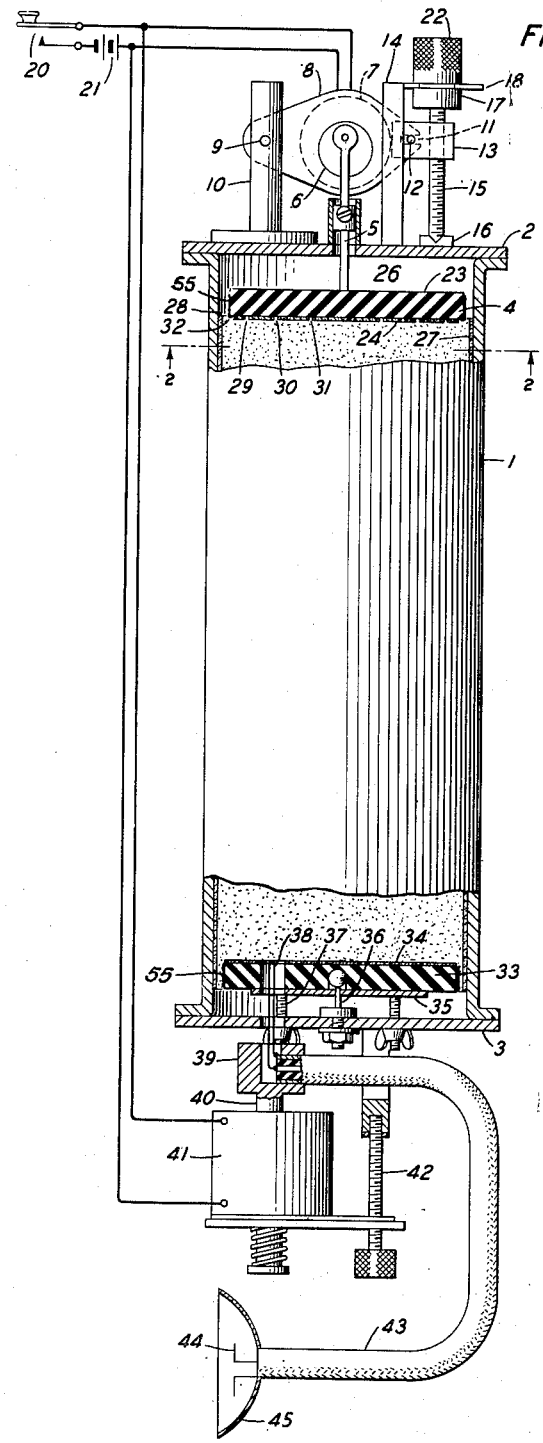
Fig. 1 illustrates an electrical resonance chamber embodying the invention the walls being partly broken away to show the interior structure in conjunction with controlling and tuning apparatus and an energy transducing guide and radiator to constitute a reradiating test system.

Referring to Fig. 1 the resonance chamber 1 consists of a cylindrical structure having an upper end or cap 2 and a lower end 3 attached thereto in any suitable manner as by screws or bolts, not shown. The cylindrical wall and the end members consist of aluminum, copper, brass or other suitable metallic material or even of a dielectric material provided with an interior plating or coating of highly conducting metal. It is important to have an intimate contact between the conducting coating and the dielectric material which supports it. The chamber is provided with a tuning apparatus comprising a piston 4 operated by a piston rod 5 connected at its upper end with an eccentric 6 mounted on the central horizontal driving shaft of a motor 7 supported on the mounting frame plate 8. Plate 8 hinged at 9 on a vertical column 10 affixed to the cap 2 is slotted at its forward end at 11 to receive a horizontal pin 12 extending laterally through the adjusting block 13 which is movable up or down within the fixed vertical support and guideway 14 also mounted on the cap 2. An adjusting screw 15 passes through a threaded aperture of the block 13 so as to permit vertical adjustment of the block 13 and of the adjacent end of the frame member 8. Screw 15 is held against vertical translation by an abutment or bearing 16 fixed to cap 2 and a collar 17 which surrounds and is fastened to screw 15 just beneath the horizontal flange 18 of the frame 14 through an opening in which the screw 15 loosely fits. It will be apparent that upon closure of key 20 to energize the motor 7 from a suitable electric current source 21, the operation of the eccentric 6 will cause reciprocation of the tuning piston 4 of the resonance chamber from a position corresponding to maximum frequency of the chamber at the lower end of its stroke to a position corresponding to minimum frequency at the upper end of the stroke. Operation of the knob 22 of the screw 15 serves to shift frame 8 and motor 7 to a higher or lower position as desired thus changing the mean frequency of the resonator as well as its maximum and minimum frequencies. The feature of the motor operated tuner for a variable frequency resonance chamber is disclosed and claimed in application Serial No. 544,990, filed July 14, 1944, which issued as U. S. Patent No. 2,537,139 to W. F. Kannenberg et al. The features of the motor supporting frame and adjusting structure are disclosed and claimed in application Serial No. 539,668, filed June 10, 1944, which issued as United States Patent 2,426,177 August 26, 1947.

The piston 4 may comprise a body portion 23 of phenol fibre or other suitable dielectric material with a coating or plating 24 of metal of high electrical conductivity. The diameter of the piston is less than that of the interior of the cylindrical cavity thus leaving a peripheral gap of the order of ⅛-inch width. This gap is in the nodal or weak field region for $TE_{01}$ oscillations and hence occasions only small attenuation for such oscillations. However, it does cause a considerable leakage for the transversely directed electric vector of the $TM_{11}$ oscillations of the same natural frequency. Energy of these TM oscillations escapes to the back space 26 above the metal plating 24 where it is highly attenuated by the dielectric material 23. The interior surface of the cylindrical walls has a high conductivity coating 27 similar to that of plating 24 and consisting of such metals as silver, copper, or gold. The coating 27 of the walls terminates at a point 28 at about the region which the conducting coating 24 reaches at the highest position of the piston 4. The unplated portion of the walls beyond point 28 cooperates in attenuation of the TM mode oscillations in the back space.

Figure 2:
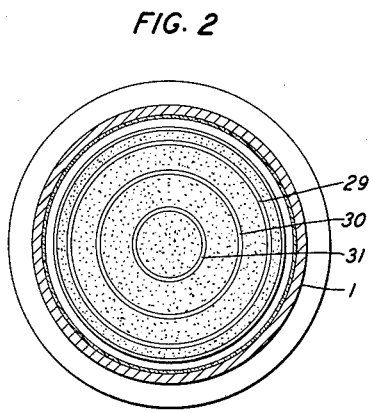
Fig. 2 is a section along the plane 2—2 of Fig. 1 viewed in the direction of the arrows.

The use of $TE_{0m}$ type oscillations enables an additional discrimination to be had in that the coated surface 24 of the piston as indicated in Fig. 2 is coextensive with $m$ half-wave zones, $m$ in this particular illustration being four. Separating these four zones are nodal regions at which are located concentric cuts or slots 29, 30, 31 through the conducting coating, like the peripheral gap 32, present little attenuation for $TE_{04}$ mode oscillations but do additionally attenuate oscillations in $TE_{lmn}$ modes where $l$ is not equal to zero and all TM modes. Since the concentric slots do not coincide with nodes of $TE_{0m}$ modes of higher or lower $m$ than four they occasion leakage and attenuation of both the higher order and lower order $TE_{0m}$ oscillations thus increasing selectivity of the resonator for oscillations of the $TE_{04}$ mode.

The resonance chamber is provided with an adjustable end plate 33 of dielectric material having a silvered interior surface 34 and a metallic skeleton back support 35. The plate 33 is pivoted on the ball and socket joint formed by a pivot bolt 36 anchored to the bottom 3. Four adjusting bolts 37 located at 90-degree peripheral separations and provided with wing adjusting nuts enable the plane of the coating 34 to be brought into parallelism with the coating 24 or to be made perpendicular to the cylindrical walls if the chamber 1 is not a perfect right cylinder. This adjustable structure is disclosed and claimed in joint application Serial No. 543,830, filed July 7, 1944, by W. A. Edson and W. F. Kannenberg for "Testing Equipment," which issued as United States Patent 2,471,419 May 31, 1949.

$TE_0$ oscillations of a right circular cylinder are inherently of a considerably higher Q than the equal frequency $TM_1$ oscillations which accompany them. The action of the attenuating dielectric and the unplated cylindrical wall of the back space in conjunction with the peripheral gap 32 is such as to discriminate effectively against oscillations of the $TM_1$ mode in favor of oscillations of the $TE_0$ mode thus enabling the effective Q of the resonance chamber for the useful $TE_0$ oscillations to be enhanced. A similar discriminating attenuation may take place at the other end of the resonance chamber because of the peripheral gap around the plate 33 and the dielectric and unplated wall of the back space at that end of the chamber.

The attenuating effect to which unwanted or extraneous modes of oscillation are subjected by the leakage through gaps and slots and by dissipation by dielectric substance exposed by the gaps and slots may be further augmented by suitably placed attenuating material such as aquadag painted or coated on the periphery of the tuning piston and of the adjustable end plate 33 as indicated at 55. This aquadag coating may also be extended to include a narrow strip on the face of the piston or the end plate as shown. This lies in a weak field region for the desired mode and in a relatively more intense field region for oscillations of the undesired modes.

Extending through a small aperture in plate 33 is a retractile coupling loop 38 supported by a housing 39 carried by a plunger 40 of solenoid 41 which is adjustably mounted by means of a frame and supporting screw 42 upon the bottom plate 3. The coupling loop 38 is electrically connected through coaxial conductor 43 to a dipole antenna 44 with which is associated a reflector 45. The retractile loop coupling feature is disclosed and claimed in application Serial No. 532,979, filed April 27, 1944, by W. F. Kannenberg, for coupling devices which issued as United States Patent 2,466,439 April 5, 1949.

In use as a test apparatus the dipole 44 picks up oscillation energy emitted by an impulse radiator or other source of microwave energy and impresses the resulting oscillations upon the coaxial conductor 43. If the key 20 has been closed to energize the solenoid 41 from the source 21 the plunger 40 is actuated to project the retractile loop 38 from its normal position as shown in which it is entirely outside the internal oscillation field of the resonance chamber into a position in which it dips into that field to excite oscillations within the resonance chamber. Upon closure of the key 20 the motor 7 is also energized and it commences the reciprocating action of the tuning piston 4. Whenever upon receipt of the incoming oscillations by the dipole 44 the piston 4 is in such position that the resonance chamber 1 agrees in its natural resonance frequency with the frequency of the incoming oscillations the resonance chamber responds strongly to build up an intense internal electromagnetic field. If, however, the position of the piston 4 does not tune the chamber 1 to the incoming oscillations the chamber, because of its extremely high Q, will not respond vigorously until coincidence in time of receipt of incoming oscillations and of tuning of the resonance chamber to the frequency of the incoming oscillations. As soon as the incoming oscillation impulse ceases the internal field within the resonance chamber 1 stops growing and begins to return energy through the pick-up loop 38 and the coaxial line 43 to the dipole 44 by which it is reradiated from the test system. In a typical operation of such apparatus a pulse of incoming oscillations received by dipole 44 and enduring for one microsecond may, if sufficiently intense, build up the internal field of the resonance chamber 1 to such a magnitude as to enable the chamber to reradiate oscillation energy of significant amplitude for a period of 20 to 30 microseconds after cessation of the impulse by which the chamber was initially excited.

Fig. 2 shows the concentric slots in the coating 24 on the face of piston 4 of the structure of Fig. 1.

Figure 3:
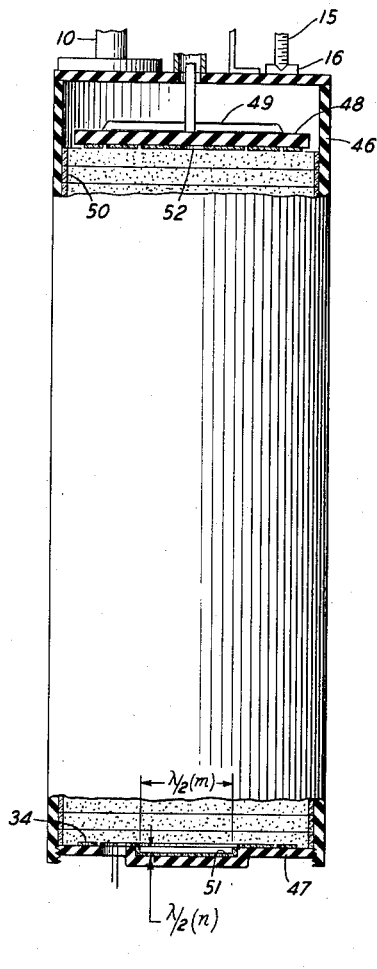
Fig. 3 shows a modification of the resonance chamber of Fig. 1.

Fig. 3 illustrates a modification of the resonance chamber 1 of Fig. 1. In this modification the chamber consists of a dielectric cylinder 46 associated with a bottom plate 47 also of dielectric material and having peripheral screw threads which engage with interior threads of the cylinder. The tuning control and the piston reciprocating mechanism may be identical with that of Fig. 1 as may also the retractile coupler. The tuning piston 48 may be identical with the piston 4 of Fig. 1 but, as illustrated, consists of a thinner plate of dielectric material with reinforcing ribs 49 extending in a radial direction from the piston to form a reinforcing spider. The plating 52 of the piston and the plating 34 of the bottom plate 47 are both divided into three zones to adapt the chamber for development of high Q in $TE_{03}$ mode oscillations.

The interior cylindrical wall consists of a congeries of superposed silvered or gold-plated or copper-plated rings 50 of thin metallic material. The rings fit nicely together and for the circular electric vector of $TE_0$ oscillations the attenuation is not greatly higher than for an unbroken cylindrical surface. However, the oscillations of all other modes experience a loss at each end of the individual rings, the escaping field being attenuated by the supporting dielectric 46 in a manner similar to the attenuation effected by the dielectric 23 of piston 4 in the structure of Fig. 1.

Not only at the periphery of the tuner piston and the bottom wall are a nodal or weak field region of TE$_{01}$ mode oscillations to be found but also in the central portion immediately adjacent the longitudinal axis of the cylinder. This fact may be taken advantage of by providing a depression 51 in the bottom plate 47 thus presenting high attenuation to the TM oscillations, and TE$_{0m}$ oscillations where $m$ is relatively large, with relatively little attenuation to oscillations of TE$_{01}$ mode.

If, as shown in Fig. 3, the depression 51 is given such dimensions as to extend radially a half wavelengths, $$\frac{\lambda}{2}(m)$$

and to extend in depth a half wavelength, $$\frac{\lambda}{2}(n)$$

in the axial direction below the upper conducting surface of the end 47 the depression will accommodate an additional element in the electromagnetic field array for oscillations of the mode which it is desired to favor. Because of the different resonant field distributions TE$_{0mn}$ modes where $m$ has a different value will be greatly perturbed in frequency, and attenuated by this structure. The increased length of path along the conducting surface in a radial direction also tends to attenuate oscillations having electric vectors in a radial direction.

Figure 4:
Fig. 4 shows a portion of a modification of the structure of Fig. 3 in which an embossed or raised part is employed in lieu of the depressed central part of the lower end member.

In lieu of the depression 51 a central boss or prominence 53 of the reverse contour may be provided by the central raised portion indicated in Fig. 4 which shows a section of the central portion only of the bottom plate 47. In this instance the internal projection 53 should be nicely centered and like the depression of Fig. 3 should be plated with high conductivity material in order not to entail an undesirable loss in the Q for oscillations of TE$_0$ mode. The dimensions of the raised portion 53 may correspond to those of the depression 51 so that the raised portion, in effect, replaces one element of the resonant electromagnetic field array associated with oscillations of the desired mode. For other modes the boss 53 increases the attenuation thus improving the Q of the resonance chamber for oscillations of the desired mode. In other respects the structure of Fig. 4 is identical with that of Fig. 3.

Figure 5:
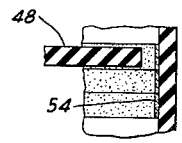
Fig. 5 shows a fragmentary view of a modification of the structure of Fig. 3 in which sectional coatings replace the superposed rings to form the cylindrical walls.

As an alternative to the superposed ring structure constituting the interior cylindrical wall of the resonance chamber of Fig. 3, there may be employed, as shown in Fig. 5 in a fragmentary detail, a cylinder of dielectric material having annular or ring-shaped coatings 54 on the dielectric material separated by scorings or slits that are as narrow as can possibly be made.

Figure 6:
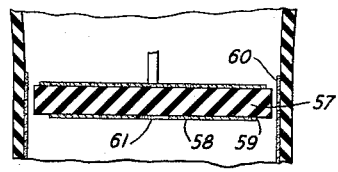
Fig. 6 shows a modification of the structure of Fig. 1 involving a tuning piston having a central apertured plating and a wide peripheral gap.

One of the most useful modes of oscillation, because of its inherently high Q, is the TE$_{01n}$ mode, where $n$ is an integer of the order of 5 to 25. A relatively simple structure which is quite effective for that mode of oscillation is disclosed in the modification of Fig. 6, which may be taken as identical with the structure of Fig. 1, with the exception of the tuning piston. The circular front plate 58 is of substantially less diameter than the dielectric plate 57 so as to provide a relatively wide gap between its periphery 59 and the inner surface of resonator wall 60. Moreover, plate 58 is provided with a central aperture at 61. The exposed surface of the plate 58 is, of course, plated or coated with metal of high conductivity, such as silver, gold or copper. The combination of the central aperture 61 and the relatively wide peripheral gap tends to discriminate strongly against undesired extraneous modes of oscillation such as TE$_{05n}$, while affecting to a relatively small degree the oscillations of the desired mode TE$_{01n}$. In this structure the central aperture 61 is in the region of a weak field for oscillations of TE$_{01}$ modes, but extends towards regions of relatively strong field for oscillations of TE$_{0n}$ modes where $n$ is considerably larger than unity.

The dielectric material used in this apparatus serves not only for attenuating undesired oscillations, thus increasing Q for desired oscillations, but also in reducing mass. This is of importance in connection with the piston tuner particularly under conditions of rapid reciprocation which would make the use of a heavy metallic structure, such as would be required in order to have the necessary rigidity, dependent upon a sturdier and hence more massive supporting and reciprocating structure.

What is claimed is:

1. An electrical cavity resonator of cylindrical conformation, one end of said resonator comprising a conducting surface of insufficient extent to close entirely the end of the chamber whereby an aperture is provided for escape of oscillation energy of undesired modes, and external energy absorbing means positioned adjacent the aperture to attenuate energy escaping therethrough.

2. An electrical cavity resonator, one wall of said resonator comprising a metallic plate separated at its periphery from the remaining walls by a gap and dielectric energy absorbing material positioned on the external side of said gap to attenuate oscillations of modes for which the gap affords an effective exit.

3. An electrical cavity resonator of cylindrical conformation, means for initiating therewithin oscillations of TE$_{01n}$ mode, one end of said chamber comprising a metallic plate of less diameter than the cylinder of the resonance chamber to leave a peripheral gap and a dielectric backing member positioned on the external side of said gap to attenuate oscillations of modes which would otherwise readily pass therethrough.

4. A cylindrical cavity resonator having parallel plane interior surfaces opposite each other, one of said surfaces being discontinuous to provide a peripheral gap therearound and a dielectric member on the exterior of said gap and exposed therethrough to the electromagnetic field within said resonance chamber whereby modes of oscillation for which said gap provides substantial transadmittance are effectively attenuated.

5. A cavity resonator comprising a cylindrical shell of conducting material, means for stimulating said resonator to execute TE$_{01n}$ mode oscillations therein, said cavity resonator having cylindrical walls composed of contiguous equal diameter rings to suppress certain undesired modes of oscillation and having plane end walls composed of concentric contiguous rings additionally to suppress modes of other than TE$_0$ type and said end walls having an apertured central portion and gaps at their respective peripheries to discriminate against TE$_{0mn}$ modes where $m$ is greater than one.

6. A cylindrical resonator of electrically conducting material, an end plate fitting loosely within the cylindrical structure to discriminate between oscillations of undesired modes having radial electric components and oscillations of desired modes substantially free from such components and a coating of energy dissipating substance around the periphery of the end plate to attenuate additionally undesired oscillations for which the field intensity is relatively high in the region between the loosely fitting end plate and the surrounding cylindrical structure.

7. In combination a high Q cavity resonator, a tuning piston therefor, said piston providing a peripheral gap therebetween and a wall of said chamber, and a lossy dielectric in said gap adapted to degrade all modes except the TE$_{0mn}$ family.

8. The structure of claim 5 and energy dissipating means in contact with said rings on their external surfaces.

9. The structure of claim 5 and a cylindrical absorber supporting said rings and contacting their external surfaces.

10. High frequency apparatus comprising a high Q, hollow cavity resonator, means for exciting said resonator in a desired TE$_{01}$ mode of electromagnetic oscillations, said cavity having a circular end wall provided with a central depression adapted to discriminate against TE$_{0m'}$ mode oscillations where $m' > 1$, said depression extending radially $$\frac{\lambda}{2}(m)$$

and having a depth $$\frac{\lambda}{2}(n)$$

where $m$, $n$ are radial and longitudinal mode indices, and $\lambda$ the corresponding wavelengths.

11. A cavity resonator of high Q, comprising a cylinder formed of a plurality of superposed rings of conductive material, means for exciting therein oscillations of a desired TE$_{01n}$ mode, said rings forming therebetween parallel peripheral slits in the cylindrical wall, said slits being located in nodal planes for said $TE_{01n}$ mode, microwave energy absorbing material on the exterior of said resonator and in contact with said slits to dissipate extraneous modes transduced through said slits, end walls for said resonator having concentric zones of conductive material, separated by concentric annular slots for suppressing extraneous modes.

12. High frequency apparatus comprising a hollow circular cylindrical cavity resonator having fixed end walls, means for exciting said resonator with electromagnetic energy in a predetermined mode of oscillation, a circular conducting plate having a diameter slightly less than the diameter of said resonator, means extending through a central opening in one of said end walls and secured at the center of said plate for moving said plate in a direction perpendicular to said one end wall while maintaining said plate parallel to said end wall to obtain a resonant condition within said resonator, and energy absorptive material positioned within the space defined by said one end wall and said plate for suppressing oscillations of modes other than said predetermined mode excited within said space.

13. The structure of claim 12, and concentric mode suppression slots in said plate for transducing undesired modes into said energy absorptive material.

14. In combination, a hollow tunable cavity resonator adapted to operate in a $TE_{0mn}$ mode, said resonator having fixed end walls and a side wall, a tuning piston having a cross-section less than that of said resonator to provide a peripheral gap, said piston having a conducting face and an energy absorptive material connected rearwardly of said face and positioned in the back cavity space defined by one end wall and said piston for suppressing extraneous modes.

15. The structure of claim 14, said piston having concentric slots therein located in a region where the $TE_{0mn}$ mode is of relatively low intensity compared to the intensity of extraneous modes.

16. The structure of claim 14, wherein said absorptive material projects into said gap and said sidewall is plated with high conductivity material and said back cavity is substantially unplated.

References Cited in the file of this patent

UNITED STATES PATENTS

| Number | Name | Date |
|---|---|---|
| 2,088,749 | King | Aug. 3, 1937 |
| 2,151,118 | King | Mar. 21, 1939 |
| 2,190,668 | Llewellyn | Feb. 20, 1940 |
| 2,197,122 | Bowen | Apr. 16, 1940 |
| 2,197,123 | King | Apr. 16, 1940 |
| 2,253,589 | Southworth | Aug. 26, 1941 |
| 2,356,044 | Foulkes | Aug. 15, 1944 |
| 2,405,277 | Thompson | Aug. 6, 1946 |
| 2,417,785 | Slepian | Mar. 18, 1947 |
| 2,439,388 | Hansen | Apr. 13, 1948 |
| 2,443,109 | Linder | June 8, 1948 |
| 2,471,419 | Edson et al. | May 31, 1949 |
| 2,484,822 | Gould | Oct. 18, 1949 |
| 2,605,459 | Cook | July 29, 1952 |